Patented Sept. 7, 1943

2,329,015

UNITED STATES PATENT OFFICE 2,329,015

PLASTICIZER FOR CELLULOSE DERIVATIVES

Jack T. Thurston, Cos Cob, and John M. Grim, Stamford, Conn., assignors to American Cyanamid Company, New York, N. Y., a corporation of Maine No Drawing. Application October 3, 1941, Serial No. 413,559

8 Claims. (Cl. 106—179)

This invention relates to plasticizers for cellulose derivatives, and more particularly to the use of aromatic glyceryl esters of alpha-hydroxyisobutyric acid and its hydroxy-substituted derivatives as plasticizers for cellulose derivatives.

Cellulosic compositions such as cellulose esters and ethers, which are commonly used in the preparation of lacquers, molding materials, photographic films, and the like are characterized by the fact that in the dry state they are excessively hard and brittle and upon subjection to relatively slight flexure or extension they check and break. For purposes of overcoming this defect it has been customary to incorporate in lacquers or varnishes containing a cellulose derivative and a volatile solvent a substantial portion of bodies designated as plasticizers. These plasticizers impart elasticity and ductility to the dried lacquer or varnish film obtained on evaporation of the volatile solvent. When such properties are imparted to the dried film, the latter may then contract or expand with the surface on which it is applied. In this manner, cracking or peeling of the film may be avoided and its adhesive qualities improved. Similarly, when cellulose derivatives are employed in the manufacture of molded articles, incorporation of substantial portions of plasticizers has brought about a more rapid and even flow of the materials in the mold and molding operations may be conducted at much lower temperatures than when no plasticizer is present.

We have found that the aromatic glyceryl esters of alpha-hydroxyisobutyric acid and its hydroxy substituted derivatives having the following formula:

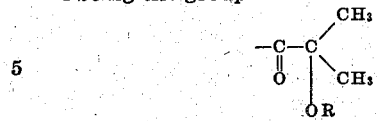

in which Ar is an aromatic radical and $X_1$ and $X_2$ are hydrogen, acyl or aromatic radicals or the group

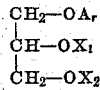

in which R is hydrogen, an alkali metal or an aliphatic, cycloaliphatic, aromatic, or heterocyclic radical, at least one of the symbols $X_1$ and $X_2$ being the group

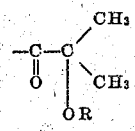

have a high compatibility with and plasticizing action upon cellulosic compositions. These esters are described and claimed in the copending application of Jack T. Thurston and John M. Grim, Serial No. 364,552, filed November 6, 1940, and as set out in that application they may be prepared by any of the methods ordinarily employed in the production of esters.

Among the various acyl radicals that can be used to replace the hydrogen of the hydroxyl group are the aliphatic acyl radicals such as formyl, acetyl, propionyl, butyryl, octanoyl, carbalkoxy, and carbaryloxy.

The acyl radical may also be that of a cycloaliphatic acid such as cyclohexyl acetic acid, camphoric acid and the like. The acyl radical may likewise be an aromatic radical such as those of benzoic acid or salicylic acid. Dicarboxylic acids may also be used to acylate the hydroxyl groups in which case two molecules of alpha-hydroxyisobutyric acid are combined with one molecule of the dicarboxylic acid, or the mono-esters of the dicarboxylic acids may be employed in which case one molecule of alpha-hydroxyisobutyric acid will combine with one molecule of the mono-ester of the dicarboxylic acid. Among the various dicarboxylic acids and mono-esters which can be used are those such as succinic, oxalic, diglycolic, sebacic, maleic, naphthalene dicarboxylic, phthalic, chlorophthalic, nitro-phthalic, and the like. The following ether-acids may also be employed to produce acylated aromatic glycerides of alpha-hydroxyisobutyric acids:

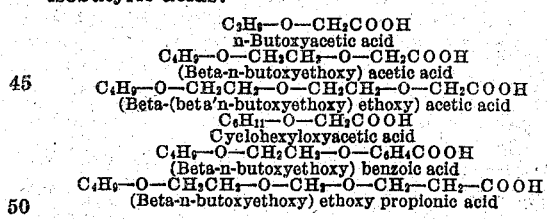

The hydrogen of the hydroxyl group may also be replaced by heterocyclic acids under certain conditions such as for example the radical of nicotinic acid.

Ethers of the aromatic glycerides of alpha-hydroxyisobutyric acid are produced when the hydrogen of the alpha-hydroxyl group in alpha-hydroxyisobutyric acid is replaced by either an alkyl, cycloaliphatic, aralkyl, or aryl group and such ethers of aromatic glycerides of alpha-hydroxyisobutyric acid have properties differing somewhat from the aromatic glycerides themselves. The alkyl radicals used to replace the hydrogen may be either saturated or unsaturated and may or may not contain substituent groups. Included in this group of alkyl radicals are the methyl, ethyl, propyl, butyl, isobutyl, octyl, as well as alkyl radicals containing carboxylic and oxy groups in the chain, to produce compounds such as the following in which R' represents a glyceryl aromatic ether radical:

(CH₃)₂CO.CH₂CH(CH₃)₂.COOR'
R'.O₂C.CH(CH₃).O.C(CH₃)₂.CO₂.R' and

R'.O₂C.C(CH₃)₂.O.CH₂CH₂O CH₂CH₂.O.C(CH₃)₂.CO₂.R'

The hydrogen of the alpha-hydroxyl group may also be replaced by alicyclic radicals such as cyclohexanyl, methyl cyclohexanyl, etc. The various aralkyl radicals may be also used to replace the hydrogen of the alpha-hydroxyl group present in alpha-hydroxyisobutyric acid such as benzyl, phenylethyl, phenylpropyl, naphthylmethyl, diphenylmethyl, diphenylethyl, cinnamyl, etc.

The hydrogen of the hydroxyl group present in the alpha-hydroxy-isobutyric acid may also be replaced by groups possessing ketone or aldehyde radicals. For example, halogenated ketones may be reacted with the sodium salt of the aromatic glycerides of alpha-hydroxyisobutyric acid to split off sodium chloride and substitute the ketone radical in place of the hydrogen of the hydroxyl group. For example, when chloroacetone is reacted as described above the following compound is produced:

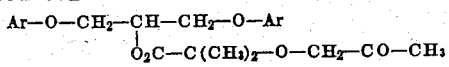

The corresponding aromatic ketones may be used instead of acetone. When chlorinated aldehydes are employed the aldehyde radical replaces the hydrogen in the hydroxyl group.

The carbonic acid esters of the aromatic glycerides of alphahydroxyisobutyric acid can be prepared by reacting the aromatic glyceride, with, for example, ethyl chloroformate to produce the alpha-carbethoxy aromatic glyceride

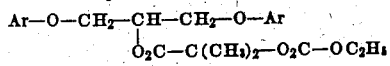

Various metal radicals may be used to replace the hydrogen on the hydroxy group of the esters and particualrly active metals such as the alkali metals sodium and potassium. These salts are produced by adding sodium or potassium to the aromatic glycerides of alpha-hydroxyisobutyric acid in an inert solvent and refluxing. In some cases it is more desirable to prepare the sodium or potassium salts by reacting the aromatic ester of alpha-hydroxyisobutyric acid with the metallic alkoxides in an inert solvent such as toluene and remove the alcohol by distillation.

The plasticizers of the present invention are compatible with and therefore may be compounded with inorganic acid esters of cellulose such as cellulose nitrate; with single organic esters of cellulose such as cellulose acetate, cellulose propionate, cellulose butyrate and cellulose stearate; with mixed organic acid esters of cellulose such as cellulose acetate-stearate, cellulose acetate-propionate, cellulose acetate-butyrate, cellulose acetate-lactate, and cellulose acetate tartrate; with mixed inorganic and organic acid esters of cellulose such as cellulose nitroacetates; and with cellulose ethers such as ethyl cellulose and benzyl cellulose.

The aromatic glyceryl esters of alpha-hydroxyisobutyric acid and its hydroxy-substituted derivatives may be used alone or in admixture with other plasticizers or softening agents such as dibutyl phthalate, camphor and the like. They are resistant to heat, light, and water and are good solvents for poorly miscible material such as triphenyl phosphate.

The invention will be further described in conjunction with the following specific examples which are for the purpose of illustration only and are not to be construed as limited to the exact details set forth:

EXAMPLE 1

25% and 50% concentrations of (1) cresylglyceryl mono-alpha-hydroxyisobutyrate, (2) cresylglyceryl di-alpha-hydroxyisobutyrate, (3) dicresylglyceryl alpha-hydroxyisobutyrate, and (4) diphenylglyceryl alpha-hydroxyisobutyrate were mixed with 20% solutions of nitrocellulose in a solvent comprising by volume 4 parts toluene, 3 parts ethyl acetate, 2 parts butyl acetate and 1 part butyl alcohol. The resulting compositions were poured onto glass and the films examined immediately after drying. The data obtained are as follows:

| Ester | g. ester | g. 20% nitrocellulose solution | Per cent ester in dried form | Films |
|---|---|---|---|---|
| 1 | 2 | 10 | 50 | Soft, well plasticized. |
|   | 1 | 10 | 25 |   |
| 2 | 2 | 10 | 50 | Not as soft as (1), but well-plasticized. |
|   | 1 | 10 | 25 |   |
| 3 | 2 | 10 | 50 | Not as soft as (1) but well-plasticized. |
|   | 1 | 10 | 25 |   |
| 4 | 2 | 10 | 50 | Some plasticizing effect. |
|   | 1 | 10 | 25 |   |

EXAMPLE 2

*Cresylglyceryl mono-alpha-hydroxyisobutyrate*

A. *Compatibility.*—Mixtures containing varying proportions of cresylglyceryl mono-alpha-hydroxyisobutyrate and solutions of cellulose derivatives were poured onto glass and the films examined after drying for one hour at 150° F. The results, based on solutions and films, are indicated in the following table where the symbol "∞" denotes complete miscibility:

| Cellulose derivative | Isobutyrate: Cellulose derivative | | |
|---|---|---|---|
|  | 1:9 | 5:5 | 9:1 |
| Ethyl cellulose | ∞ | ∞ | ∞ |
| Cellulose acetobutyrate | ∞ | ∞ | ∞ |
| Cellulose acetopropionate | ∞ | ∞ | ∞ |
| Cellulose acetate | ∞ | ∞ | ∞ |

It is evident from the above data that cresylglyceryl mono-alpha-hydroxyisobutyrate is compatible with each of the cellulose derivatives investigated.

B. *Tensile strength.*—Tensile strengths of mixtures of cresylglyceryl mono-alpha-hydroxyisobutyrate and 20% solutions of nitrocellulose in a solvent comprising by volume 4 parts toluene, 3 parts ethyl acetate, 2 parts butyl acetate and 1 part butyl alcohol in the preparation of 1:9 and 2.5:7.5 were compared with those of dibutyl phthalate and nitrocellulose in the same proportions. The results are as follows:

| Film | Film thickness | Film width | Tensile strength | Elongation |
|---|---|---|---|---|
| | Inches | Inches | Lbs./in.² | Per cent |
| Cresylglyceryl mono-alpha-hydroxyisobutyrate and nitrocellulose—1:9 | 0.0011 | 0.5 | 9,940 | 2.5 |
| Dibutyl phthalate and nitrocellulose—1:9 | 0.001 | 0.5 | 9,580 | 3.0 |
| Cresylglyceryl mono-alpha-hydroxyisobutyrate and nitrocellulose—2.5:7.5 | 0.0012 | 0.5 | 9,010 | 4.0 |
| Dibutyl phthalate and nitrocellulose—2.5:7.5 | 0.0011 | 0.5 | 8,380 | 4.0 |

Considering that the most desirable plasticizer is one which possesses the greatest per cent elongation with little loss in tensile strength, it will be evident that cresylglyceryl mono-alpha-hydroxyisobutyrate and dibutyl phthalate are substantially equally effective as plasticizers for nitrocellulose. In the proportion of 1:9, cresylglyceryl mono-alpha-hydroxyisobutyrate is slightly inferior to dibutyl phthalate since the half-percent less elongation corresponds to a very slightly higher tensile strength. However in the proportion of 2.5:7.5, the cresylglyceryl mono-alpha-hydroxyisobutyrate shows marked superiority over dibutyl phthalate.

C. *Hardness.*—Two white enamels were made containing each of the two plasticizers: cresylglyceryl mono-alpha-hydroxyisobutyrate and dibutyl phthalate. The composition of the enamels was as follows:

Parts by weight
Titanium dioxide _____ 100
20% nitrocellulose in solvent comprising by volume 4 parts toluene, 3 parts ethyl acetate, 2 parts butyl acetate and 1 part butyl alcohol _____ 100
Phthalic glyceride resin modified with coconut and cottonseed oil fatty acids _____ 150
Plasticizer _____ 40

Two coats of the enamels were sprayed on bare steel panels and air dried. Sward hardness determinations were then made with the following results:

| Plasticizer | 1 hr. | Air dried 3 hrs. | 6 hrs. | 48 hrs. |
|---|---|---|---|---|
| Cresylglyceryl mono-alpha-hydroxyisobutyrate | 4 | 8 | 16 | 26 |
| Dibutyl phthalate | 10 | 18 | 22 | 24 |

Initially, the cresylglyceryl mono-alpha-hydroxyisobutyrate retarded the drying of the enamels in comparison with dibutyl phthalate but after 48 hours both were very similar in their degree of hardness, the cresylglyceryl mono-alpha-hydroxyisobutyrate showing slight superiority.

EXAMPLE 3

*Dicresylglyceryl alpha-hydroxyisobutyrate*

A. *Compatibility.*—Mixtures containing varying proportions of dicresylglyceryl alpha-hydroxyisobutyrate and solutions of cellulose derivatives were poured onto glass and the films examined after drying for one hour at 150° F. The results, based on both solutions and films, are indicated in the following table where the symbol "∞" denotes complete miscibility:

| Cellulose derivative | Isobutyrate: Cellulose derivative | | |
|---|---|---|---|
| | 1:9 | 5:5 | 9:1 |
| Ethyl cellulose | ∞ | ∞ | ∞ |
| Cellulose acetobutyrate | ∞ | ∞ | ∞ |
| Cellulose acetopropionate | ∞ | ∞ | ∞ |
| Cellulose acetate | ∞ | ∞ | Slightly incompatible. |

B. *Tensile strength.*—Tensile strengths of mixtures of dicresylglyceryl alpha-hydroxyisobutyrate and 20% solutions of nitrocellulose in a solvent comprising by volume 4 parts toluene, 3 parts ethyl acetate, 2 parts butyl acetate and 1 part butyl alcohol in the proportions of 1:9 and 2.5:7.5 were compared with those of dibutyl phthalate and nitrocellulose in the same proportions. The results are as follows:

| Film | Film thickness | Film width | Tensile strength | Elongation |
|---|---|---|---|---|
| | Inches | Inches | Lbs./in.² | Per cent |
| Dicresylglyceryl alphahydroxyisobutyrate and nitrocellulose—1:9 | 0.001 | 0.5 | 10,200 | 2.0 |
| Dibutyl phthalate and nitrocellulose—1:9 | 0.001 | 0.5 | 9,580 | 3.0 |
| Dicresylglyceryl alpha-hydroxyisobutyrate and nitrocellulose—2.5:7.5 | 0.0011 | 0.5 | 9,140 | 3.0 |
| Dibutyl phthalate and nitrocellulose—2.5:7.5 | 0.0011 | 0.5 | 8,380 | 4.0 |

In both proportions, the tensile strengths of the films containing the plasticizer of the present invention are greater than of those containing dibutyl phthalate. It may be concluded, therefore, in view of the slightly better per cent elongation of the dibutyl phthalate films, that dicresylglyceryl alpha-hydroxyisobutyrate are substantially equally effective as plasticizing agents for nitrocellulose.

C. *Hardness.*—Two white enamels were made containing each of the two plasticizers: dicresylglyceryl alpha-hydroxyisobutyrate and dibutyl phthalate. The composition of the enamels was the same as in Example 2, part C.

Two coats of the enamels were sprayed on bare steel panels and air dried. Sward hardness determinations were then made with the following results:

| Plasticizer | 1 hr. | Air dried 3 hrs. | 6 hrs. | 48 hrs. |
|---|---|---|---|---|
| Dicresylglyceryl alphahydroxyisobutyrate | 4 | 8 | 10 | 22 |
| Dibutyl phthalate | 10 | 18 | 22 | 24 |

As in the case of cresylglyceryl mono-alpha-hydroxyisobutyrate, the enamel film containing dicresylglyceryl alpha-hydroxyisobutyrate was slower drying but after 48 hours, both films were very similar in their degree of hardness. Dicresylglyceryl alpha-hydroxyisobutyrate is slightly inferior in this respect to cresylglyceryl mono-alpha-hydroxyisobutyrate.

Similarly, the aromatic glyceryl esters of alpha-alkoxy-isobutyric and alpha-acyloxyisobutyric acids may be incorporated with cellulose derivatives to produce a plasticized product. Specifically, phenylglyceryl di-alpha-ethoxyisobutyrate, cresylglyceryl mono-alpha-methoxyisobutyrate, diphenylglyceryl alpha-acetoxy-isobutyrate, di-cresylglyceryl alpha-propionoxy-isobutyrate, etc., may be used to advantage in the compositions of the present invention.

Plastic compositions containing the plasticizers of the present invention find use, as indicated above, in the preparation of lacquers, varnishes, molding compositions, photographic film, artificial silk, coating composition, laminated articles, etc.

We claim:

1. A composition of matter comprising a cellulose derivative selected from the group consisting of cellulose ester and cellulose ethers and as a plasticizer therefor a compound having the following general formula:

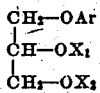

in which Ar is an aromatic radical, and $X_1$ and $X_2$ are members of the group consisting of hydrogen, acyl, aromatic radicals, and the group

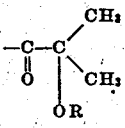

in which R is a member of the group consisting of hydrogen, alkali metals, aliphatic, cycloaliphatic, aromatic, and heterocyclic radicals, at least one of the symbols $X_1$ and $X_2$ representing the radical

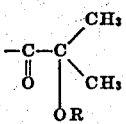

2. A composition of matter comprising a cellulose derivative selected from the group consisting of cellulose esters and cellulose ethers and as a plasticizer therefor an aromatic glyceride of alpha-hydroxyisobutyric acid.

3. A composition of matter comprising a cellulose derivative selected from the group consisting of cellulose esters and cellulose ethers and as a plasticizer therefor a compound having the following general formula:

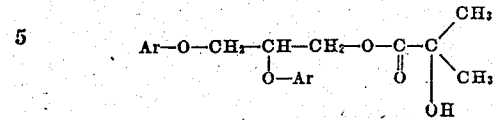

in which Ar represents an aromatic radical.

4. A composition of matter comprising a cellulose derivative selected from the group consisting of cellulose esters and cellulose ethers and as a plasticizer therefor a compound having the following general formula:

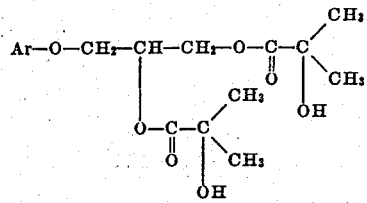

in which Ar represents an aromatic radical.

5. A composition of matter comprising a cellulose derivative selected from the group consisting of cellulose esters and cellulose ethers and as a plasticizer therefor an aromatic glyceride of an alpha-alkoxyisobutyric acid.

6. A composition of matter comprising a cellulose derivative selected from the group consisting of cellulose esters and cellulose ethers and as a plasticizer therefor an aromatic glyceride of an alpha-acyloxyisobutyric acid.

7. A composition of matter comprising a cellulose derivative selected from the group consisting of cellulose esters and cellulose ethers and as a plasticizer therefor cresyl glyceryl mono-alpha-hydroxyisobutyrate.

8. A composition of matter comprising a cellulose derivative selected from the group consisting of cellulose esters and cellulose ethers and as a plasticizer therefor di-cresylglyceryl-alpha-hydroxyisobutyrate.

JACK T. THURSTON.
JOHN M. GRIM.

CERTIFICATE OF CORRECTION.

Patent No. 2,329,015. September 7, 1943.

JACK T. THURSTON, ET AL.

It is hereby certified that error appears in the printed specification of the above numbered patent requiring correction as follows: Page 1, second column, line 42, in the formula, for "$C_2H_9-O-CH_2COOH$" read --$C_4H_9-O-CH_2COOH$--;

page 2, second column, line 9, for "nitroacetates" read --nitroacetate--; and that the said Letters Patent should be read with this correction therein that the same may conform to the record of the case in the Patent Office.

Signed and sealed this 26th day of October, A. D. 1943.

(Seal)

Henry Van Arsdale,
Acting Commissioner of Patents.